United States Patent [19]

Mendiratta et al.

[11] Patent Number: 4,781,826

[45] Date of Patent: Nov. 1, 1988

[54] APPARATUS FOR DECONTAMINATING PCB-CONTAMINATED DIELECTRIC FLUIDS

[75] Inventors: Ashok K. Mendiratta, Niskayuna; Wayne F. Morgan, Mechanicville; Craig W. Horneck, Scotia, all of N.Y.; Nie-Jiann Wen, Weston, Mass.

[73] Assignee: General Electric Company, Schenectady, N.Y.

[21] Appl. No.: 128,314

[22] Filed: Dec. 3, 1987

[51] Int. Cl.[4] .............................................. B01D 21/30

[52] U.S. Cl. .................................... 210/139; 210/149; 210/181; 210/199; 210/200; 210/205; 210/218; 210/219; 210/909

[58] Field of Search ............... 210/139, 143, 149, 177, 210/181, 182, 195.1, 199, 200, 202, 205, 206, 218, 219, 221.2, 253, 258, 909

[56] References Cited

U.S. PATENT DOCUMENTS

| | | | |
|---|---|---|---|
| 3,759,387 | 9/1973 | Drayton | 210/139 X |
| 4,033,868 | 7/1977 | Meichsner et al. | 210/200 X |
| 4,477,354 | 10/1984 | Fessler | 210/909 X |
| 4,514,294 | 4/1985 | Layman et al. | 210/909 X |
| 4,696,739 | 9/1987 | Pedneax | 210/199 X |

*Primary Examiner*—Charles Hart
*Attorney, Agent, or Firm*—Robert A. Cahill

[57] ABSTRACT

A mobile apparatus for chemically decontaminating PCB-contaminated dielectric fluids utilizes three reactors through which the contaminated fluid is processed on a repetitive, sequential batch basis automated by a programmable controller. The processing of each reactor batch includes a charging cycle during which a reactor is filled with contaminated fluid, a reaction cycle during which the PCBs are destroyed by reaction with reagents introduced into a reactor, and a discharging cycle during which the reactor is emptied of decontaminated fluid and reaction by-products into a decanting tank for ultimate separation. The controller coordinates the sequential batch processing through the three reactors in 120° time phased relation such that a charging cycle of one reactor batch, a reaction cycle of a second reactor batch and a discharging cycle of the third reactor batch are all coincident in time during normal operation.

26 Claims, 2 Drawing Sheets

APPARATUS FOR DECONTAMINATING PCB-CONTAMINATED DIELECTRIC FLUIDS

The present invention relates to apparatus for decontaminating organic solvents and is particularly directed to apparatus for removing polychlorinated biphenyls (PCBs) from dielectric fluids used in electrical equipment, such as mineral oil used in power transformers.

BACKGROUND OF THE INVENTION

Polychlorinated biphenyls, or "PCBs", were long used as dielectric fluids in electrical equipment because these materials have excellent heat stability, are nonflamable in nature, and have low volatility and good viscosity characteristics at normal operating temperatures.

In 1976, congress enacted the Toxic Substances Control Act (TSCA) as a response to public concern over hazardous waste. PCBs were the only substances named in the act. On May 31, 1979, the EPA published the PCB "Ban Rule" regulating fluids containing over 50 parts per million (ppm) PCBs. Since promulgating the "Ban Rule", the EPA has issued many additional regulations addressing PCB-related issues and defining various uses and restrictions on PCB fluids and equipment containing PCBs.

Because of these PCB concerns and the potential risk and liabilities associated with the use and removal of PCB fluids and equipment from service, facility owners must carefully evaluate the various options for disposing of PCBs and PCB contaminated equipment. While EPA regulations do permit the destruction of PCB-contaminated combustible fluids by incineration in an approved manner or disposal of PCB contaminated materials in an improved landfill, such procedures have not been particularly acceptable to the surrounding community and are costly.

Considering the case of liquid-filled power transformers, the majority in service today use either mineral oil or PCBs as their insulating fluid. While both fluids were used separately in their intended application, many mineral oil filled transformers were contaminated with PCBs during manufacturing or servicing. While the estimated number of contaminated units in service vary, there are at least 2.5 million transformers contaminated with more than 50 ppm of PCBs and considerable more units with more than 5 ppm of PCBs. Since many states are enforcing rules requiring clean up of PCB spills where contamination levels are as low as 5 to 10 ppm, the quantity of PCB contaminated oil still in use and which will be or is subject to regulation and disposal is vast.

As an alternative to incineration as a means for destroying PCBs, various processes have been proposed for chemically destroying PCBs. One of these processes involves the use of metallic sodium which, although effective, requires special handling, and trace amounts of water must be eliminated to minimize dangerous side reactions. Another effective approach to the chemical destruction or decomposition of PCBs which is considerably safer is to react the PCBs in transformer oils with a suitable glycol, such as polyethylene glycol (PEG) and a suitable alkali metal hydroxide, such as potassium hydroxide (KOH). Both PEG and KOH are non-proprietary chemical substances commonly used in industry and do not pose any unusal hazards. Complete reaction of the PCBs with the PEG and KOH reagents occurs quickly under relatively mild process conditions, producing decontaminated transformer oil and a non-PCB byproduct. The small quantities of byproducts produced are insoluble in transformer oil and thus are easily removed.

While sodium based processes destroy PCBs by sequentially stripping away chlorine atoms from the biphenyl molecule over time, the process utilizing the PEG and KOH reagents destroys PCBs by virtue of a simple chemical substitution of a glycol atom for a chlorine atom in the biphenyl system. While multiple substitutions of chlorine atoms may occur, only a single substitution is needed to render the PCB byproduct molecule insoluble in the transformer oil. This non-PCB byproduct can be easily removed from the oil by a simple separation process, such as decanting. The non-PCB byproducts can be incinerated, while the decontaminated oil may be used as a fuel in conventional heating equipment.

For a more detailed description of this PCB chemical decomposition process utilizing alkali metal hydroxides in combination with suitable glycols, reference may be had to the commonly assigned Brunell U.S. Pat. Nos. 4,353,793; 4,351,718; and 4,410,422, as well as the commonly assigned Mendiratta et al. U.S. Pat. No. 4,663,027. The disclosures of these patents are incorporated herein by reference.

OBJECTS OF THE INVENTION

It is accordingly an object of the present invention to provide apparatus for performing a process for chemically decomposing polychlorinated aromatic hydrocarbons contained in an inert organic solvent.

An additional object is to provide apparatus of the above character capable of operating on a substantially automated basis.

A further object is to provide apparatus of the above character which is capable of implementation on a mobile unit, such as a tractor trailer.

Another object of the present invention is to provide apparatus of the above character which is capable of decontaminating large quantities of inert organic solvent on a sequential batch basis.

Yet another object is to provide apparatus of the above character which is capable of safely and efficiently reducing the quantity of polychlorinated aromatic hydrocarbons in organic solvents to acceptable levels.

Other objects of the invention will in part be obvious in part appear hereinafter.

SUMMARY OF THE INVENTION

In accordance with the present invention, there is provided apparatus for carrying out the process disclosed in the above cited U.S. patents of chemically destroying polychlorinated aromatic hydrocarbons, such as polychlorinated biphenyl (PCBs), in an inert organic solvent, such as dielectric fluids, utilizing an alkaline metal hydroxide and a glycol as reagents. In accordance with a signal feature of the invention, the apparatus is constructed such as to be capable of accommodation on a mobile rig, such as a tractor trailer, facilitating its transport to various sites where PCB-contaminated dielectric fluids are being stored awaiting decontamination.

To this end, the apparatus includes at least three vessels or reactors into which contaminated fluid is pumped via a main inlet line during sequential charging cycles. A heater, incorporated in the main inlet line, is energized to heat the decontaminated fluid to an appropriate reaction temperature. As each reactor is filled during a batch charging cycle, the reagents are introduced to precipitate the reaction resulting in the chemical destruction of the PCBs therein. Upon expiration of an appropriate batch reaction cycle time interval, the then decontaminated fluid in the reactors is pumped out during sequential batch discharging cycles through a main outlet line which is disposed in thermally coupled relation with the main inlet line in an heat exchanger. The processing of the contaminated fluid in the three reactors is on a sequential batch basis with each batch process comprising a charging cycle, a reaction cycle and a discharging cycle.

The batch sequencing is such that as the decontaminated fluid in one reactor is being pumped out through the main outlet line during a batch discharging cycle, a second reactor is being filled with contaminated fluid through the main inlet line during a batch charging cycle, and thus the heat content of the fluid being discharged is utilized to heat the contaminated charging fluid, thereby assisting the heater in bringing the incoming fluid up to the appropriate reaction temperature. At the same time that the two reactors are being respectively charged and discharged, the fluid in of the third reactor is being held in a reaction state for the prescribed batch reaction cycle time interval. The flow rates of the incoming contaminated fluid and the outgoing decontaminated fluid are regulated such that the charging and discharging cycle times wih respect to any two reactors are of equal duration, which is equal to the reaction cycle time interval necessary to destroy the PCBs in the fluid contents of the third reactor. This batch sequence operation is coordinated by a controller operating automatically to control the energization of the heater, the operations of the various pumps and valves, and the additions of the requisite amounts of reagents to effect the PCB destruction reaction, such that the reactor batches are individually processed on a time basis phased 120° relative to each other.

The invention accordingly comprises the features of construction, combination of elements, and arrangements of parts which will be exemplified in the detailed description hereinafter set forth, and the scope of the invention will be indicated in the claims.

For a fuller understanding of the objects of the invention, reference may be had to the following detailed description, taken in conjunction with the accompanying drawings, in which:

FIG. 1 is a schematic diagram of the PCB decontamination apparatus constructed in accordance with a preferred embodiment of the present invention; and FIG. 2 is a timing diagram illustrating the phasing of the batch sequence operation of the apparatus of FIG. 1.

DETAILED DESCRIPTION

Figure 1:
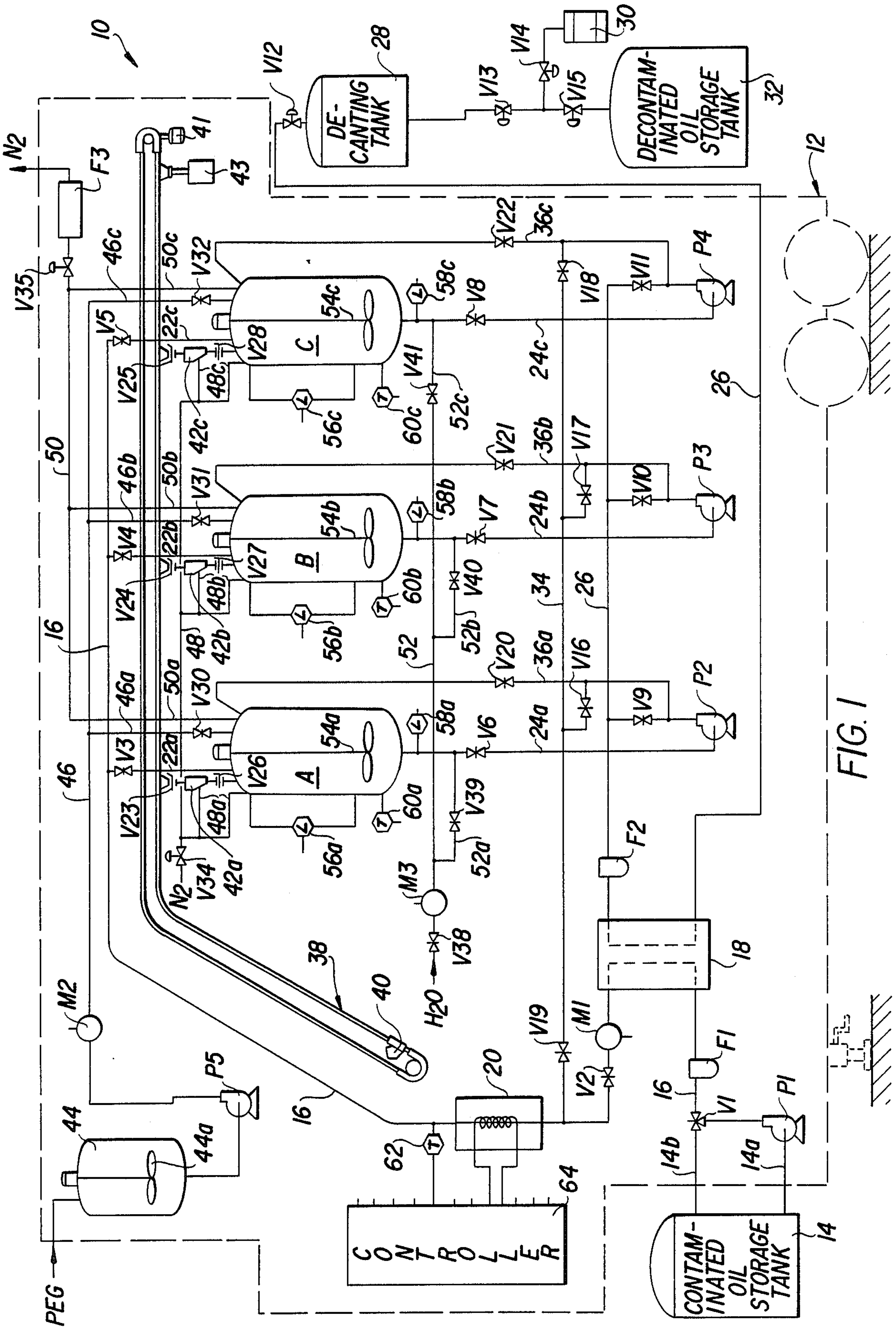

The apparatus of the present invention, as illustrated in FIG. 1 and generally indicated at 10, is constructed as a mobile unit mountable on a tractor trailer, generally indicated at 12, for transport to a site where a dielectric fluid such as transformer mineral oil contaminated with polychlorinated aromatic hydrocarbons, such as polychlorinated biphenyls (PCBs), is stored in a tank 14. The suction input of a pump P1 is connected by a hose **14*a* to the storage tank to pump contaminated oil to a three-way valve V1. This valve is normally positioned to recirculate the contaminated oil back to tank 14 via a hose 14*b*, thus to maintain the contaminated oil in continuous movement to ensure a substantially uniform PCB concentration throughout the tank and to keep the suction input of pump P1 filled. In its other position, three-way valve V1 delivers contaminated oil pumped from tank 14 by pump P1 to a main inlet line 16 for flow through a bag filter F1, a heat exchanger 18, a mass flow meter M1, a main inlet valve V2, and an electric heater 20. From this main inlet line, contaminated oil is pumped through one of three branch inlet lines 22*a*, 22*b* and 22*c* to fill one of three reactors A, B and C during a batch charging cycle as selected by opening one of valves V3, V4 and V5 connected in branch inlet lines 22*a*, 22*b* and 22*c***, respectively.

Communicating with the bottoms of reactors A, B and C are separate outlet branch lines **24*a*, 24*b* and 24*c*, which are connected through respective discharge valves V6, V7 and V8 to the suction inputs of separate pumps P2, P3 and P4. The outputs of pumps P2, P3 and P4 are connected via valves V9, V10 and V11, respectively, to route the discharges of decontaminated oil from the reactors to a main outlet line 26 during a batch discharging cycle. The outgoing decontaminated oil is conveyed by this main outlet line through a bag filter F2, heat exchanger 18, and a valve V12 to a decanting tank 28 situated externally of trailer 12. At appropriate intervals, for example once a day, the non-PCB reaction byproducts are decanted from tank 28 through valves V13 and V14 to a waste drum 30 for eventual disposal. The decontaminated oil is then drained or pumped from tank 28 through valves V13 and V15 to a decontaminated oil storage tank 32** where it is held for eventual utilization as a safe fuel.

The outputs of reactor discharge pumps P2, P3 and P4 are also connected via valves V16, V17 and V18, respectively, to a common recirculating line 34. As will be seen from the operating description to follow, during a startup routine contaminated oil charged into one of the reactors A, B and C is recirculated through common recirculating line 34 and open valve V19, main inlet line 16 and the appropriate one of the branch inlet lines **22*a*, 22*b* and 22*c* back to the same reactor for reheating by heater 20. Also connected to the outputs of pumps P2, P3 and P4 are separate recirculating lines 36*a*, 36*b* and 36*c***, respectively, which serve to recirculate the transformer oil back into the same reactor from which it was pumped out under the control of separate valves V20, V21 and V22. As will be seen from the description to follow these separate reactor recirculating loops are utilized to promote the chemical destruction of the PCBs in the contaminated transformer oil during a portion of a batch charging cycle and a batch reaction cycle for each reactor batch.

To initiate the chemical decomposition or destruction of the PCB contaminants in the transformer oil charged into the reactors during a batch charging cycle, apparatus 10 includes means for selectively conveying the requsite reagents to the reactors for introduction thereinto. To this end, a suitable conveyor, such as an aeromechanical type conveyor 38, is utilized to deliver an alkali metal hydroxide, such as potassium hydroxide (KOH), to the individual reactors. More specifically, an appropriate quantity of KOH flakes or pellets is emptied from bags into a hopper 40. Conveyor motor 41 is then energized, and the KOH in hopper 40 is delivered to a selected one of three charging pots **42*a*, 42*b* and 42*c*** under the control of slide valves V23, V24 and V25.

After each of these pots has been charged in sequence with the appropriate quantity of KOH, the introductions thereof into the reactors A, B and C are controlled by slide valves V26, V27 and V28, respectively. Conveyor 38 is also equipped to collect any residual KOH which failed to drop off into the individual pots in a spill bucket 43.

The other reagent to be introduced into the reactors to effect PCB destruction is a suitable glycol, such as polyethelene glycol (PEG). PEG is pumped from drums (not shown) external of trailer 12 into a vessel 44 where it is held for selective, metered conveyance to the individual reactors. An agitator 44a maintains the liquid PEG in motion so it remains reasonably viscous even at low temperatures. At the proper time, a metering pump P5 withdraws PEG from vessel 44 for delivery through a mass flow meter M2 to a main reagent line 46. From this main line, PEG is selectively introduced into reactors A, B and C through branch reagent lines 46a, 46b and 46c, respectively under the control of valves V30, V31 and V32.

To discourage oxidation of the heated transformer oil, it is preferred that the chemical PCB destruction process be carried out under a blanket of a suitable inert, such as nitrogen ($N_2$). To this end, nitrogen is introduced through a manually operated valve V34 to a main gas line 48 which communicates with branch lines 48a, 48b and 48c serving to introduce the inert gas atmosphere to the individual KOH charging pots and into the individual reactors. In addition, the individual reactors are vented via vent gas lines 50a, 50b and 50c to a vent header 50 which is connected via a manual pressure regulating valve V35 and a suitable filter F3 to the atmosphere. Valves V34 and V35 are adjusted to provide a suitable nitrogen blanket pressure in the reactors, such as three psi. Filter F3 may include a knockout drum for removing mist entrained in the nitrogen gas vented from the reactors, a finned tube to remove heat, and a carbon bed filter for extracting any organics and PCBs from the nitrogen gas released to the atmosphere.

As disclosed in the commonly assigned, copending Mendiratta application Ser. No. 036,161, filed Apr. 6, 1987 and entitled "Method for Removing Polyhalogenated Hydrocarbons from Non-Polar Organic Solvent Solutions", it has been discovered that after the PCB chemical destruction reaction is completed, the addition of a suitable cleansing agent, preferably water, affords a fast and efficient method for cleansing the process equipment by dissolving the sticky viscous mass of KOH-PEG reaction byproducts from the equipment surfaces. This post reaction water addition of from one or two percent by weight of the reactor contents is also found to enhance the separation process in decanting tank 28. To this end water is introduced through a metering valve V38 and a mass flow meter M3 to a main water line 52, which is, in turn, connected by branch water lines 52a, 52b and 52c to the individual reactor branch outlet lines 24a, 24b and 24c, respectively. Water is thus introduced during each batch reaction cycle to the post reaction contents of the individual reactors under the control of valves V39, V40 and V41 during the recirculations thereof through their separate recirculation loops including recirculating lines 36a, 36b and 36c.

Each of the reactors A, B and C is respectively equipped with an agitator in the form of a motor driven stirrer 54a, 54b, 54c, liquid level detectors 56a, 56b, 56c, empty level detectors 58a, 58b, 58c, and liquid temperature detectors 60a, 60b, 60c. A temperature sensor 62 is positioned to sense the temperture of the contaminated transformer oil in main inlet line 16 as it exits heater 20.

Batch sequence operation of the apparatus 10 is automated under the control of a controller 64, which may be a programmable logic controller, such as a PLC Series Six controller manufactured by the General Electric Company. Thus, although not shown in order to avoid unduly complicating the schematic diagram, it is understood that controller 64 is wired to control the positions of all of the illustrated electrically actuated valves, the energizations of the various pumps and agitators , the level of energization of electric heater 20, and the introductions of KOH, PEG and water. Also not shown are position indicators operating to signal the controller as to the current valve positions, thus enabling the controller to verify that the individual valves have correctly responded to controller commands. The controller also receives signal readings from the various level detectors, mass flow meters, and temperature sensors pursuant to controlling the operations of the various components to achieve the requisite batch sequence processing of the contaminated oil in accordance with the invention.

Figure 2:
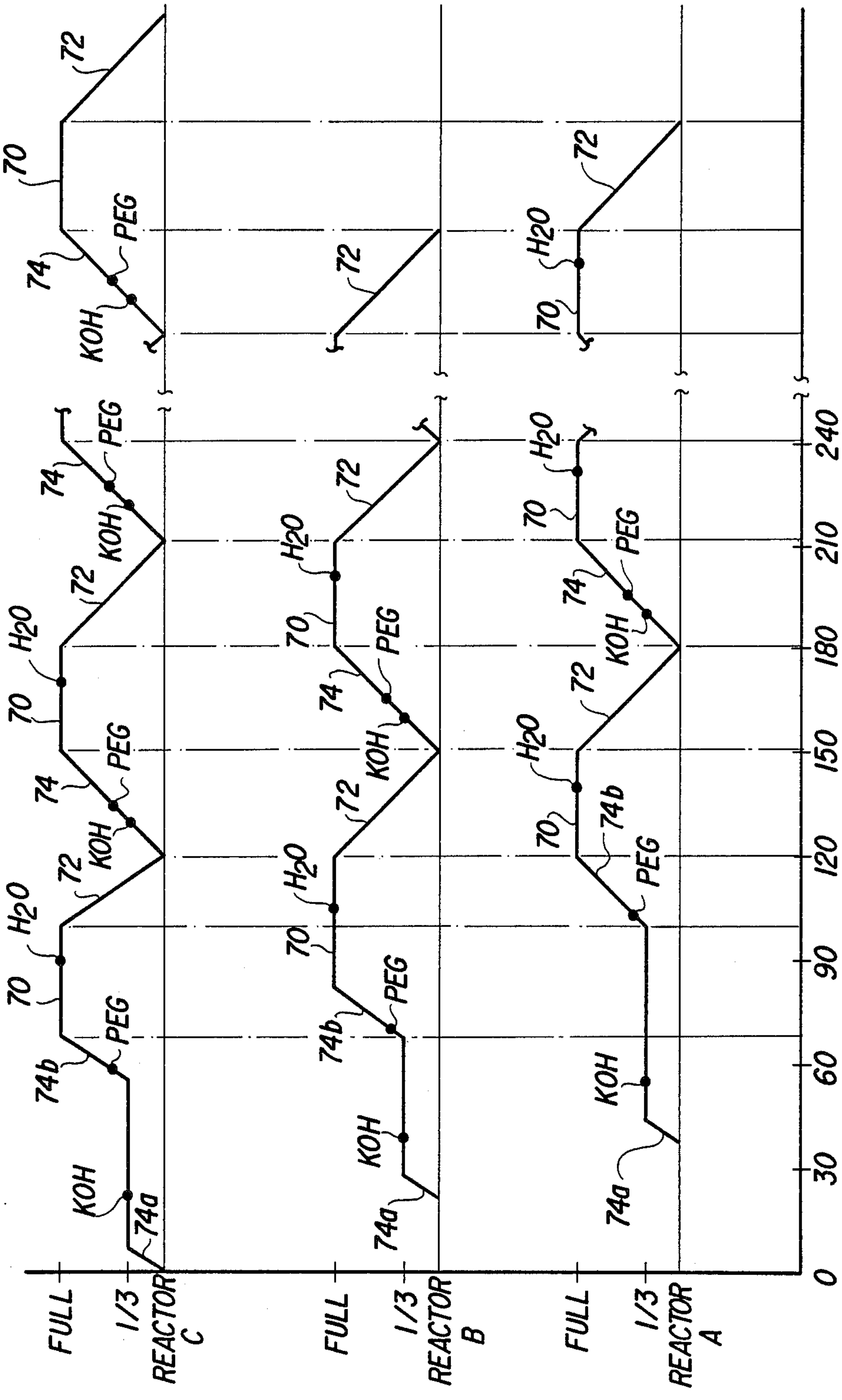

To describe this batch sequencing operation of apparatus 10, the operations of the various components thereof will be considered in conjunction with the operating sequence timing diagram of FIG. 2, which illustrates the time phasing of the charging, reaction and discharging cycles of each reactor batch. Prior to the initiation of a startup routine, as would normally occur at the start of each day's contaminated oil processing run, the level of liquid PEG in vessel 44 is checked and replenished if necessary. KOH is added to the hopper 40 of conveyor 38 which is then energized to charge each of the pots 42a, 42b and 42c with the requisite quantity of KOH reagent, in the range of twenty five to fifty pounds, to process a single batch of contaminated transformer oil in each of the reactors A, B and C. Slide valves V23, V24 and V25 are selectively actuated in any desired order to effect charging of the KOH pots. This is basically the only manual operation required.

While the startup procedure may begin with the charging of any one of the reactors, it will be assumed that the controller 64 is programmed to initially charge reactor C. Thus as seen in FIG. 2, at time zero, controller 64 positions three-way valve V1 to discontinue recirculating the contaminated oil through storage tank 14 and to direct the contaminated oil pumped from the tank by pump P1 through valve V1 and into main inlet line 16. At the same time valves V2 and V5 are opened by the controller. Contaminated oil thus flows through the heat exchanger 18, mass flow meter M1, metering valve V2, heater 20, branch inlet line 22c and valve V5 into reactor C. Preferably, to speed up the start-up routine, pump P1 is energized and valve V2 is regulated under the control of controller 64 to establish a higher flow rate than is established during a normal operating routine . Heater 20 is energized to maximum capacity under the control of the controller to rapidly heat the contaminated oil being charged into reactor C. Thus, at this higher flow rate, as indicated in FIG. 2, reactor C is charged to a ⅓ full level in approximately 6.5 minutes. If for, example, each reactor holds 360 gallons, then upon reactor C being charged with 120 gallons, level sensor 56c and mass flow meter M1 signal this condition to signal controller 64, which then repositions main inlet valve V1 to restore the recirculating of contaminated oil back to tank 14. Metering valve V2 is then closed, and valves V8, V18 and V19 are all opened by the controller. Pump P4 is then energized to recirculate the contaminated oil charged into reactor C through common recirculating line 34 for reheating by heater 20. The reheated oil returns to reactor C via main inlet line 16, open valve V5 and branch inlet line 22c. Controller 64, in response to temperature sensor 62, controls the energization of heater 20 such as to achieve an oil temperature at the heater exit of approximately 260° F. When the temperature of the contaminated oil in reactor C reaches 248° F., temperature sensor 60c signals controller 64 to de-energize heater 20 and to close valves V5, V18 and V19, discontinuing the recirculation of oil through heater 20. Valve V22 in recirculating line 36c is then opened to establish a short recirculating loop exclusively into and out of reactor C. Once this short recirculating loop is established, dump valve V28 is opened by the controller to empty the KOH charge held in pot 42c into reactor C. Agitator 54c is then energized at low speed. As seen in FIG. 2, the addition of KOH into reactor C is effected at about the 22 minute mark into the startup routine.

Upon the addition of KOH and while the contents of reactor C are being recirculated through the short recirculating loop including recirculating line 36c and valve 22 by pump P4 and stirred by agitator 54c, controller 64 conditions three-way main inlet valve V1 to direct the contaminated oil into main inlet line 16 for charging reactor B to ⅓ full through now opened metering valve V2, re-energized heater 20 and valve V4 in branch inlet line 22b. Again this ⅓ charge is effected at a higher than normal flow rate such that the ⅓ full level in reactor B is achieved in approximately 6.5 minutes, as illustrated in FIG. 2. At that point, level detector 56b signals this condition which is verified by mass flow meter M1, and controller 64 repositions main inlet valve V1 for the recirculation of contaminated oil back into storage tank 14 and closes metering valve V2. The reheating recirculating loop for reactor B is then established by opening valves V7, V17 and V19, and energizing pump P3. The contaminated oil in reactor B is then recirculated through heater for reheating in the same manner as previously described for reactor C. Again, controller energizes heater 20 to achieve a reheated oil temperature of approximately 260° F. as determined by temperature sensor 62. When the oil temperature in reactor B reaches 248° F., temperature sensor 60b signals controller 64 to de-energize heater 20 and close valves V4, V19 and V17 in this reheating recirculation loop. Valve V21 in recirculating line 36b is then opened to establish the short recirculating loop for the contents of reactor B, after which valve V27 is opened to dump the KOH charge in pot 42b into reactor B. Agitator 54 is energized by controller 64 to stir the reactor B contents at a slow speed while it is being pumped through its short recirculating loop by pump P3. As illustrated in FIG. 2, the KOH charge is introduced into reactor B at about 38 minutes into the start-up routine.

At substantially the same time that the KOH is introduced into reactor B, controller opens metering valve V2 in the main inlet line 16 and valve V3 in the branch inlet line 22a to reactor A, and main inlet valve V1 is repositioned to discontinue the recirculation of contaminated oil back to storage tank 14 and instead contaminated oil is pumped therefrom into the main inlet line. Heater 20 is re-energized to heat the contaminated oil being charged into reactor A, again at a faster than normal rate. When the level in reactor A reaches the ⅓ full mark at approximately the 45 minute mark (FIG. 2), level detector 56a and mass flow meter M1 signal controller 64 to close metering valve V2 and restore main inlet valve V1 to its recirculating position. As in the case of reactors B and C, the controller opens valves V6 in the reactor A branch outlet line 24a, energerizes pump P2, and opens valves V16 and V19 to direct the reactor A contents through common recirculating line 34. Again, controller energizes heater 20 such as to achieve a temperature of 260° F. for the reheated oil exiting therefrom, as sensed by temperature sensor 62. When the contaminated oil in reactor A reaches 248° F., temperature sensor 60a signals controller 64 to de-energize heater 60, close valves V3, V16 and V19, and open valve V20 in recirculating line 36a to establish the short recirculating loop for reactor A. Slide valve V26 is then opened to dump the KOH charge held in pot 42a into reactor A, and agitator 54a is energized by controller to begin stirring the reactor A contents at a slow speed. At this point, the operator has ample time to manually recharge KOH pots 42a, 42b and 42c preparatory to the processing of the next three batches.

At approximately 55 minutes into the start-up routine as seen in FIG. 2, when the KOH charge has been dumped into reactor A, the controller 64 opens metering valve V2 and valve V5 in the branch inlet line 22c leading to reactor C, energizers heater 20, and positions main inlet valve V1 to direct contaminated oil into main inlet line 16. Reactor C is thus charged with contaminated oil from ⅓ full to full at the higher than normal flow rate, taking about 13 minutes as illustrated in FIG. 2. The energization of heater 20 is controlled such as to maintain the temperature of the oil in reactor C at approximately 212° F. Approximately four minutes after commencement of filling reactor C, the controller energizes metering pump P5 and opens valve V32 in reagent branch inlet line 46c to withdraw the requisite amount of PEG for introduction into reactor C. Mass flow meter signals controller 64 to de-energize pump P5 and close valve V32 when this requisite amount, in the range of twenty five to fifty pounds, has been introduced into reactor C. As this reactor fills, agitator 54C is contolled by controller 64 to increase its stirring speed progressively to maximum while the contents is being recirculated through the short recirculating loop by pump P4. When reactor C becomes full, level detector 56c signals controller 64 at approximately the 68 minute mark to close valve V5 in the reactor in the branch inlet line 22c for reactor C and to open valve V4 in branch inlet line 22b to fill reactor B from ⅓ full to full, as illustrated in FIG. 2. Approximately four minutes later, controller 64 controls the addition of PEG into reactor B in the same manner as described above for reactor C. At approximately the 80 minute mark, reactor B becomes full, and this fact is signaled to controller 64 by level detector 56b and confirmed by mass flow meter M1. The controller then de-energizes heater 20, closes valves V4 and V2, and repositions main inlet valve V1 to recirculate contaminated oil back to storage tank 14.

While reactor B is being filled, the transformer oil in reactor C is stirred by agitator 54c at full speed and also is being pumped through the short recirculating loop including recirculating line 36c during a batch reaction cycle 70 (FIG. 2) for a prescribed reaction interval which, in the illustrated embodiment, is of at least 30 minutes duration. At 20 minutes into this reaction cycle for reactor C, controller 64 opens valve V38 and valve V41 to introduce a predetermined quantity of water, as determined by mass flow meter M3, into mixture with the transformer oil at a suitable point in the short recirculating loop, such as at branch outlet line 24*c*. At the end of the 30 minute reaction cycle time interval for reactor C, which is at about the 97 minute mark into the startup routine, the transformer oil in reactor C has been effectively decontaminated of PCBs and the equipment cleansed by the water addition, and is thus ready to be discharged.

Accordingly, controller closes valve V22 in the short recirculating loop, and opens valve V11 to connect the high pressure output of pump P4 to main outlet line 26. At the same time, a controller opens valve V3 in the branch inlet line 22*a* to reactor A and metering valve V2 in the main inlet line 16, and repositions main inlet valve V1 to connect the high pressure output of pump P1 to the main inlet line. It is thus seen that as decontaminated oil is discharged from reactor C through main outlet line 26 to decanting tank 28 during a batch discharging cycle 72 (FIG. 2), contaminated oil is being pumped through main inlet line 16 into reactor A, filling it from its ⅓ full level to its full level. Since the main inlet and outlet lines both pass through heat exchanger 18, a significant portion of the heat energy contained in the discharging decontaminated oil is transferred to the contaminated oil being charged into reactor A. Consequently, the level of energization of heater 20 necessary to heat the contaminated oil being charged into reactor A to the requisite reaction temperature is reduced, thereby saving energy. It will be noted from FIG. 2, that the charging and discharging flow rates are adjusted by controller 64 such that the time required to completely discharge reactor C is substantially the same as the time required to charge reactor A from ⅓ full to full. Thus reactor C is discharged at an appropriately faster rate than reactor A is charged.

During this reactor A charging cycle, controller 64 controls the addition of the PEG reagent into reactor A in the manner described for reactors B and C. From FIG. 2, it is seen that from the initiation of startup, it takes approximately 120 minutes to obtain the first batch of decontaminated oil from the apparatus 10. The full discharge of this and subsequent batches of decontaminated oil from reactor C is sensed by empty level detector 58C in the branch outline 24*c*, and controller 64 is signalled accordingly to de-energize pump P4, while level detector 56*a* signals the controller when reactor A is full to close valve V3 in branch inlet line 22*a*. Situating empty level detectors 58*a*, 58*b*, and 58*c* in the reactor branch oulet lines 24*a*, 24*b*, 24*c*, respectively, is preferred to ensure that discharging cycles 72 are not terminated before the reactors are completely emptied, thus minimizing the exposure of the next batch to water left over from the previous batch. Also, as reactor C is being discharged, the speed of its agitator 54*c* is progressively reduced to zero, while the speed of agitator 54*a* is progressively increased to full speed as reactor A is filled and the PEG reagent is introduced thereinto.

By the time reactor C has been fully discharged and reactor A has been fully charged, reactor B has undergone the requisite reaction cycle time interval during which water is introduced, and is ready to be discharged. Consequently, controller 64 closes valve V21 in the reactor B recirculating loop and opens valve V10 connecting the output of pump P3 to main outlet line 26, and at the substantially the same time, opens valve V5 in branch inlet line 22*c* for reactor C. It is thus seen that the now decontaminated oil in reactor B is discharged through the main outlet line and heat exchanger 18 during a batch discharging cycle 72 at the same time that reactor C is being charged through main inlet line 16 and heat exchanger 18 during a batch charging cycle 74 (FIG. 2). The contaminated oil is thus preheated by the decontaminated oil, rather than reheated via the common recirculating line 34, and then raised to the requisite reaction temperature by heater 20. Since the reactors and associated piping have now been brought up to normal operating temperatures, the startup routine is discontinued by the controller, and the ensuing batch cycle sequencing is in accordance with a normal operating routine. This, coupled with the fact that the heat of the discharging batch of decontaminated oil is now available for transfer to the charging batch of contaminated oil makes unnecessary the above-described two-step charging cycles, indicated at 74*a* and 74*b* in FIG. 2, executed during the startup routine. Accordingly, the reactors are thereafter filled during charging cycles 74 and emptied during discharging cycles 72 in the continuous, uninterrupted fashion illustrated in FIG. 2. Since the reaction cycle time required to decontaminate a batch of transformer oil in one reactor is of at least 30 minutes duration, inclusive of the 10 minute cleansing phase thereof accomplished with the addition of water, maximum efficiency is achieved if the concurrent charging and discharging cycles are also of 30 minutes duration. Under these circumstances and as seen in FIG. 2, batches of contaminated oil are drawn from tank 14 and batches of decontaminated oil are delivered to a decanting tank 28 in succession with little or virtually no flow interruptions between batches. Thus, during a normal operating routine, contaminated oil is pumped into the apparatus 10 and decontaminated oil is pumped out as though the decontamination process were a continuous process rather than the batch process that in fact it is. As also seen in FIG. 2, during the normal operating routine, the transformer oil batches are processed through the three reactors with their respective batch charging, reaction and discharging cycles in 120° time phased relation to each other.

During each charging cycle, as seen in FIG. 2, when a particular reactor is ⅓ full, its associated level sensor signals controller 64 to introduce KOH, bring the associated agitator up to slow speed and estalish the associated short recirculating loop, and approximately 4 minutes thereafter, the controller effects the introduction of the PEG reagent and gradually increases the agitator speed to full speed as the charging cycle comes to completion, all on an automated basis. The short recirculating loop and the full agitator speed are maintained by the controller during the reaction cycle with the addition of water effected ten minutes before the completion thereof. The controller initiates a charging cycle for each reactor upon being advised by its empty level detector that its discharging cycle has been completed. The only operation not effected automatically by the controller during the normal operating routine is the loading of hopper 40 with KOH and activation of conveyor 38 to refill the individual reactor KOH charging pots each time the controller alerts the operator that all three have become empty.

As the end of a day's run approaches, the controller is conditioned to execute a shutdown routine which simply involves the discontinuance of further batch charging cycle initiations. Thus as seen in FIG. 2, if a shutdown routine is initiated as reactor C is undergoing a batch charging cycle and reactor B is involved in a batch discharging cycle, these batch cycles are completed. However, the batch charging cycle for reactor B that normally coincides with the batch discharging cycle for reactor A is not initiated. As reactor A is undergoing its batch discharging cycle, reactor C is involved in its batch reaction cycle. At the conclusion thereof, the batch discharging cycle for reactor C is executed, but the batch charging cycle for reactor A is not. Once reactor C is emptied, it does not undergo an ensuiing batch charging cycle, and the apparatus is fully shut down.

Decanting tank 28, which may be a truck trailer tank capable of travelling with apparatus trailer 12 to various contaminated oil storage sites, should have sufficient capacity to hold a full day's run of decontaminated oil, in excess of 5000 gallons assuming an eight hour run. At the end of the day, the contents of tank 28 may be recirculated using a recirculating pump and associated piping (not shown), and a sample is drawn and analyzed for PCB concentration using suitable instrumentation, such as a vapor phase chromatograph. The trailer landing jacks should then be raised slightly such that the non-PCB reaction byproducts, a heavy liquid phase (PEG with reacted PCB complex) and an aqueous KOH phase, accumulate overnight toward the discharge end of tank 28. The next morning, the separations of these reaction byproduct phases from the lighter, decontaminated transformer mineral oil should be observable in a sightglass (not shown). The reaction byproducts are drained off into waste drum 30, and the remaining transformer oil is then recirculated in tank 28 by the recirculating pump for approximately thirty minutes. The transformer oil is then analyzed to verify that it has been decontaminated of PCB's down to an acceptable concentration of, for example, less than two parts per million, and is then pumped into storage tank 32.

It is thus seen that the objects set forth above, including hose made apparent from the preceding description, are efficiently attained, and since certain changes may be made in the above construction without departing from the scope of the invention, it is intended that all matters contained in the above description and shown in the accompanying drawings shall be interpreted as illustrative and not in a limiting sense.

What is claimed as new and desired to secure by Letter Patent is:

1. Apparatus for reducing the quantity of polychlorinated aromxtic hydrocarbons in an inert organic solvent, said apparatus comprising in combination:

A. at least three reactors;

B. a main inlet line;

C. a separate, valved branch inlet line connecting said main inlet line to each of said reactors;

D. a first pump for pumping the solvent through said main and branch inlet lines into said reactors;

E. a heater included in said main inlet line for heating the solvent pumped therethrough;

F. means for separately introducing metered quantities of reagents to each of said reactors;

G. a main outlet line;

H. a separate valve branch outlet line connecting each said reactor to said main outlet conduit;

I. a separate second pump included in each said branch outlet line for pumping the solvent from said reactors through said branch outlet and main outlet lines; and J. a controller for controlling the operations of said pumps, heater, reagents introducing means, and said valved inlet and outlet branch lines in repeating, timed phased batch sequence such that while solvent is being pumped through said main inlet line to fill one of said reactors during a batch charging cycle, solvent is being pumped through said main outlet line to empty a second one of said reactors during a batch discharging cycle and the polychlorinated aromatic hydrocarbons in the solvent in the third one of said reactors is undergoing reaction with said reagents during a batch reaction cycle.

2. The apparatus defined in claim 1, wherein said controller controls said repeating, time phased batch sequence such that solvent flow through said main inlet and main outlet lines is substantially uninterrupted from batch to batch.

3. The apparatus defined in claim 1, which further includes a heat exchanger included in said main inlet and main outlet lines for coupling the solvent concurrently pump therethrough in heat exchanging relation.

4. The apparatus defined in claim 3, which further includes means connected with said main outlet line for separating the inert organic solvent from the reaction byproducts of said reagents with the polychlorinated aromatic hydrocarbons.

5. The apparatus defined in claim 4, wherein said reagents are an alkali metal hydroxide and a glycol.

6. The apparatus defined in claim 5, which further includes means controlled by said controller for introducing during each reaction cycle a metered quantity of a cleansing agent into the solvent in a selected one of said reactors upon completion of the reaction therein of said reagents with the polyhalogenated aromatic hydrocarbons.

7. The apparatus defined in claim 6, which further includes means for maintaining a blanketing inert gas atmosphere in said reactors.

8. The apparatus defined in claim 7, which further includes a first recirculating line connecting each said branch outlet line with said main inlet line, whereby the solvent in one of said reactors is pumped through said first recirculating line, said main inlet line, said heater and the associated one of said branch inlet lines back into said one reactor under the control of said controller.

9. The apparatus defined in claim 8, wherein each said reactor is equipped with an agitator operating under the control of said controller to promote the reaction therein of said reagents with the polyhalogenated aromatic hydrocarbon.

10. The apparatus defined in claim 9, wherein each said reactor includes a second, separate recirculating line connected between a reactor inlet and the associated one of said branch outlet lines, whereby to provide separate recirculation loops accommodating the flow of the solvent into and out of said reactors under the control of said controller.

11. The apparatus defined in claim 10, wherein said cleansing agent introducing means is connected to separately introduce said cleansing agent into each said recirculation loop.

12. The apparatus defined in claim 11, which further includes liquid level sensors for monitoring the level of solvent in each said reactor, said controller operating to control the operations of said first pump and said second pumps in response to signals received from said liquid level sensors.

13. The apparatus defined in claim 12, which further includes temperture sensors for sensing the temperature of the solvent in said reactors, said controller controlling the energization of said heater and the activation of said reagents introducing means in response to signals received from said temperature sensors.

14. The apparatus defined in claim 13, wherein said separating means comprises a decanting tank.

15. Apparatus for decontaminating PCB-contaminated dielectric fluids, said apparatus comprising, in combination:

A. at least three reactors;

B. a main inlet line;

C. a separate branch inlet line connecting said main inlet line to each said reactor;

D. a first pump for pumping contaminated dielectric fluid through said main inlet and branch inlet lines into said reactors during separate batch charging cycles;

E. a heater included in said main inlet line for heating contaminated dielectric fluid pumped therethrough;

F. means separately introducing metered quantities of at least one reagent into each said reactor;

G. a main outlet line;

H. a separate branch outlet line connecting each said reactor to said main outlet line;

I. a separate second pump for pumping decontaminated dielectric fluid from each said reactor through said branch outlet and main outlet lines during separate batch discharging cycles, said batch charging and batch discharging cycles for each said reactor being separated in time by an intervening reaction cycle during which PCBs in the dielectric fluid are chemically decomposed;

J. a heat exchanger included in both said main inlet and main outlet lines for coupling the dielectric fluids pumped therethrough in heat exchanging relation; and K. a controller for controlling said pumps, heater and reagent introducing means such that dielectric fluid is normally processed through said reactors on a repetitive, sequential batch basis with said charging, reaction and discharging cycles of the respective reactor batches being respectively phased 120° apart in time.

16. The apparatus defined in claim 15, wherein said charging, reaction, and discharging cycles of each said reactor batch are all of substantially equal time duration as controlled by said controller duration.

17. The apparatus defined in claim 16, wherein each said charging cycle for anyone of said reactors, each said reaction cycle for any second one of said reactors, and each said discharging cycle for any third one of said reactors all are substantially coincident in time.

18. The apparatus defined in claim 15, which further includes separate valves in said main inlet and main outlet lines, and said branch inlet, and branch outlet lines whose valve positions are automatically controlled by said controller.

19. The apparatus defined in claim 15, which further includes means connected with said main outlet line for separating the decontaminated dielectric fluid from the non-PCB byproducts of the reaction of PCBs with said reagent in each said reactor.

20. The apparatus defined in claim 19, which further includes means controlled by said controller for introducing into each said reactor during each said batch reaction cycle therefor a metered quantity of water.

21. The apparatus defined in claim 20, wherein said reagent introducing means separately introduces an alkali metal hydroxide and a glycol into said reactors during each said charging cycle therefor.

22. The apparatus defined in claim 18, which further includes a common recirculating line connecting each said branch oulet line to said main inlet line through separate recirculating valves controlled by said controller, whereby, during a startup routine, said controller interrupts said charging cycles to temporarily establish a recirculating loop through said common recirculating line for each said reactor to permit reheating of contaminated fluid by said heater.

23. The apparatus defined in claim 18, which further includes a separate recirculating line connected between an inlet of each said reactor and the associated one of said outlet branch lines by a separate recirculating valve controlled by said controller, whereby said controller establishes a separate recirculating loop for the dielectric fluid in each said reactor during each said batch reaction cycle therefor.

24. The apparatus defined in claim 23, wherein each said reactor is equipped with an agitator controlled by said controller for stirring the dielectric fluid therein during each said batch reaction cycle therfor.

25. The apparatus defined in claim 18, which further includes separate liquid level detectors for monitoring the dielectric fluid level in said reactors, said controller controlling said batch charging and discharging cycles in response to signals from said liquid level detectors.

26. The apparatus defined in claim 25, which further includes separate sensors for sensing the temperature of the dielectric fluid in said reactors, said controller controlling the energization of said heater in response to temperature signals received from said sensors.

* * * * *